US008270552B1

(12) United States Patent
Oner

(10) Patent No.: US 8,270,552 B1
(45) Date of Patent: Sep. 18, 2012

(54) SYSTEM AND METHOD FOR TRANSFERRING DATA FROM NON-SPREAD CLOCK DOMAIN TO SPREAD CLOCK DOMAIN

(75) Inventor: Mustafa Ertugrul Oner, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 677 days.

(21) Appl. No.: 12/393,902

(22) Filed: Feb. 26, 2009

(51) Int. Cl.
*H04L 7/00* (2006.01)

(52) U.S. Cl. ........ 375/354; 375/130; 375/226; 375/295; 375/362; 375/371; 375/372; 375/373; 375/376; 455/260; 455/502; 455/516; 327/141; 327/147; 327/156; 714/707

(58) Field of Classification Search .................. 375/130, 375/226, 295, 354, 362, 371, 372, 373, 376; 455/260, 502, 516; 327/141, 147, 156; 714/707
See application file for complete search history.

(56) References Cited

U.S. PATENT DOCUMENTS

| | | | | |
|---|---|---|---|---|
| 4,941,156 A | * | 7/1990 | Stern et al. | 375/372 |
| 7,787,515 B2 | * | 8/2010 | Mobin et al. | 375/130 |
| 2002/0172310 A1 | * | 11/2002 | Thamsirianunt et al. | 375/371 |

* cited by examiner

*Primary Examiner* — Leon Flores
(74) *Attorney, Agent, or Firm* — North Weber & Baugh LLP

(57) ABSTRACT

An apparatus for transferring data in a non-spread domain to a spread domain. The apparatus comprises a first-in-first-out (FIFO) memory; a write pointer generator adapted to generate a write pointer for writing data into the FIFO memory in response to a non-spread clock signal; a spread-clock generator adapted to generate a spread clock signal based on the non-spread clock signal; a read pointer generator adapted to generate a read pointer for reading data from the FIFO memory in response to the spread clock signal; and a controller adapted to control the spread-clock generator in response to the read and write pointers indicating predetermined potential data overflow or underflow of the FIFO memory.

29 Claims, 10 Drawing Sheets

SYSTEM AND METHOD FOR TRANSFERRING DATA FROM NON-SPREAD CLOCK DOMAIN TO SPREAD CLOCK DOMAIN

FIELD OF THE INVENTION

This invention relates generally to data transfer systems, and in particular, to a system and method for transferring data from a non-spread clock domain to a spread clock domain.

BACKGROUND OF THE INVENTION

In many applications, data is sent in a serial manner from a transmitting device to a receiving device. In order to properly receive the serial data, the receiving device typically needs timing information about when each datum, symbol or bit of the serial data is to be received. In some cases, the data is transmitted with an associated clock signal which provides the timing information needed for the receiving device to properly receive the data. In other cases, the receiving device develops the associated clock signal by sensing the phase of the incoming serial data. In both cases, the associated clock signal has a frequency that is substantially constant. Because of this, relatively high energy is concentrated in substantially a single frequency, which may result in electromagnetic interference (EMI) problems. This is explained more with reference to the following example.

FIG. 1 illustrates a block diagram of a serializer/deserializer (Ser/Des) communication system 100. The Ser/Des communication system 100 includes a serializer 102 communicatively coupled to a deserializer 104. The serializer 102 typically includes a plurality of inputs to receive time-sensitive parallel data, and an input to receive a clock signal CLK1. Using the clock signal CLK1, the serializer 102 multiplexes the parallel data to generate serial data and transfers the serial data to the deserializer 104. The deserializer 104, in turn, uses another clock signal CLK2 to receive and convert the serial data back to parallel data. For proper conversion of the serial data to parallel data, the clock signal CLK2 of the deserializer 104 should cycle with substantially the same frequency as that of the clock signal CLK1 of the serializer 102.

Typically, both clock signals CLK1-2 are configured to cycle with a frequency that is substantially constant. Because of this, the energy of the clock signals as well as the data is concentrated substantially at a single frequency. This may result in the emission of electromagnetic interference (EMI) at substantially that particular frequency. This could adversely affect other components operating in proximity to the deserializer 104. Thus, there is a need to reduce EMI in such Ser/Des communication system 100.

SUMMARY OF THE INVENTION

An aspect of the invention relates to an apparatus for transferring data in a non-spread domain to a spread domain. The apparatus comprises a first-in-first-out (FIFO) memory; a write pointer generator adapted to generate a write pointer for writing data into the FIFO memory in response to a non-spread clock signal; a spread-clock generator adapted to generate a spread clock signal based on the non-spread clock signal; a read pointer generator adapted to generate a read pointer for reading data from the FIFO memory in response to the spread clock signal; and a controller adapted to control the spread-clock generator in response to the read and write pointers indicating predetermined potential data overflow or underflow of the FIFO memory.

In another aspect of the invention, the controller is adapted to determine a lag of the read pointer to the write pointer in preventing the data overflow or underflow of the FIFO memory. For instance, if the controller determines that the lag decreases below one or more predetermined thresholds (e.g., approaching a data overflow situation), the controller instructs the spread-clock generator to add a positive frequency offset to the frequency of the spread clock for each crossing of a threshold. If, notwithstanding the corrections, the controller determines that the lag decreases beyond another predetermined threshold that is very close to an overflow situation where loss of data occurs, the controller resets the operation of the system.

Similarly, if the controller determines that the lag increases above one or more predetermined thresholds (e.g., approaching a data underflow situation), the controller instructs the spread-clock generator to add a negative frequency offset to the frequency of the spread clock for each crossing of a threshold. If, notwithstanding the corrections, the controller determines that the lag increases beyond another predetermined threshold that is very close to an underflow situation where loss of data occurs, the controller resets the operation of the system.

Other aspects, advantages and novel features of the present invention will become apparent from the following detailed description of the invention when considered in conjunction with the accompanying drawings.

DETAILED DESCRIPTION OF THE EXEMPLARY EMBODIMENTS

Figure 1:
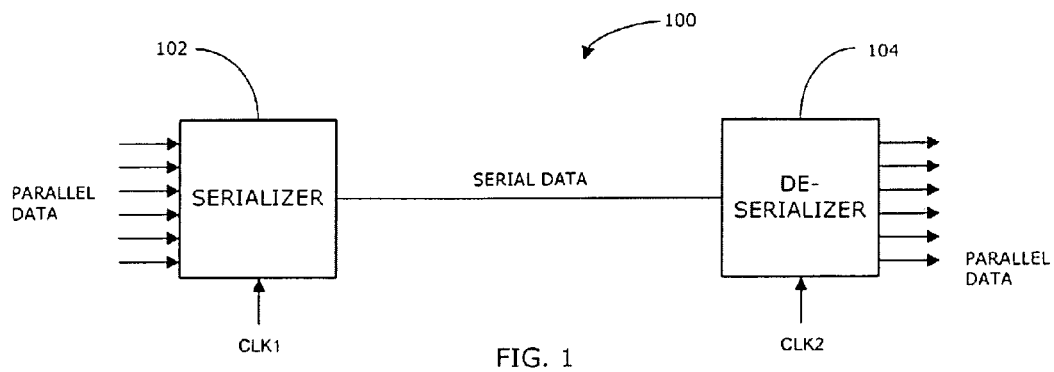
FIG. 1 illustrates a block diagram of a serializer/deserializer (Ser/Des) communication system.
Figure 2A:
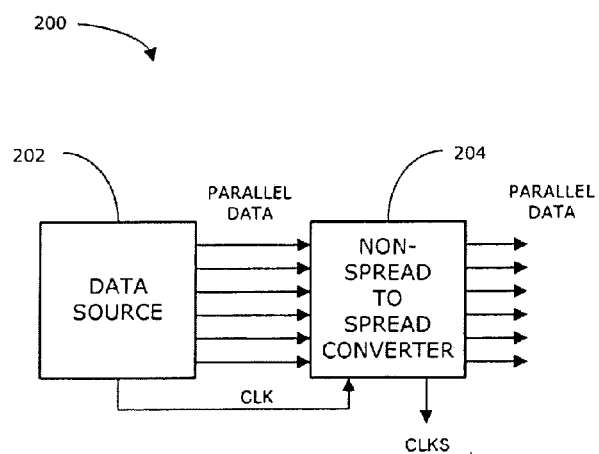
FIG. 2A illustrates a block diagram of an exemplary communication system in accordance with an embodiment of the invention.

FIG. 2A illustrates a block diagram of an exemplary communication system 200 in accordance with another embodiment of the invention. In summary, the communication system 200 is particularly suited for reducing electromagnetic interference (EMI) by converter data in a non-spread domain to a spread domain. In particular, the communication system 200 comprises a data source 202 and a non-spread to spread converter 204. The data source 202 generates parallel data and transfer the data to the converter 204 using a substantially constant frequency (non-spread) clock signal CLK.

The converter 204, in turn, using the non-spread clock signal CLK to receive or clock in the parallel data. The converter 204, in turn, generates a frequency-modulated (spread) clock signal CLKS from the non-spread clock signal CLK. The converter 204 uses the spread clock signal CLKS to clock out the parallel data. Because the spread clock CLKS clocks out the parallel data, the energy of the output parallel data is spread over a larger frequency range. Thus, the concentration of the energy is no longer at substantially a single frequency, but rather spread over a frequency range dictated by the modulation. This may have the beneficial result of reducing EMI.

Figure 2B:
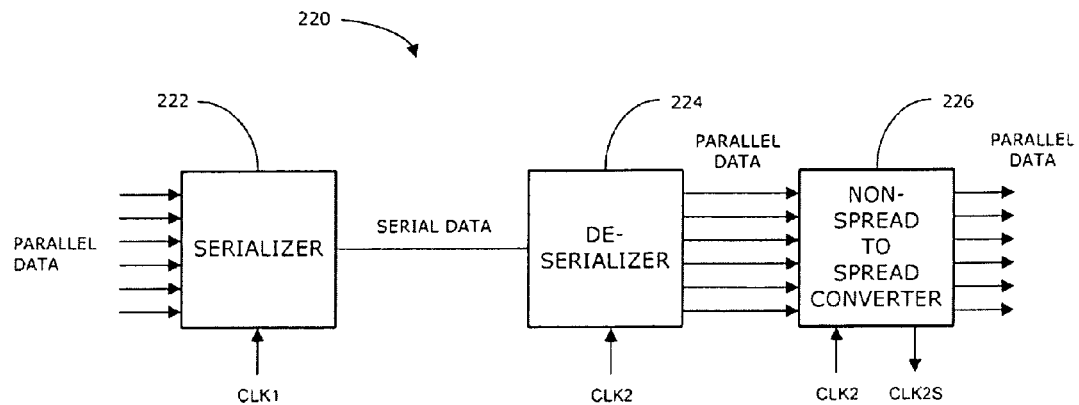
FIG. 2B illustrates a block diagram of an exemplary serial/deserializer (Ser/Des) communication system in accordance with another embodiment of the invention.

FIG. 2B illustrates a block diagram of an exemplary serializer/deserializer (Ser/Des) communication system 220 in accordance with an embodiment of the invention. The Ser/Des communication system 200 illustrates one exemplary application of the non-spread to spread converter previously discussed. In summary, the Ser/Des communication system 220 includes a non-spread to spread domain converter at the receiving side to spread the energy of the clock signal (as well as the data) across a broader frequency range in order to reduce the concentration of energy at substantially a single frequency, and thus reduce electromagnetic interference (EMI).

In particular, the Ser/Des communication system 220 comprises a serializer 222 at a data transmitting side, and a deserializer 224 and a non-spread to spread domain converter 226 at a data receiving side. The serializer 222 receives parallel data, and multiplexes the parallel data using a clock signal CLK1 to generate and transmit serial data from the transmitting side to the receiving side. The deserializer 224 receives and converts the serial data back to parallel data using another clock signal CLK2. The frequency of the clock signal CLK2 of the deserializer 224 may be substantially the same frequency of the clock signal CLK1 of the serializer 222. The parallel data generated by the deserializer 224 is applied to inputs of the non-spread to spread domain converter 226.

As discussed in more detail below, the converter 226 generates a spread clock signal CLK2S from the clock signal CLK2 of the deserializer 224. This may be accomplished by frequency modulating the clock signal CLK2 in order to generate the spread clock signal CLK2S. The clock signal CLK2 is used by the converter 226 to clock in the parallel data from the deserializer 224. The spread clock signal CLK2S is used by the converter 226 to clock out the parallel data. Because the spread clock CLK2S clocks out the parallel data, the energy of the parallel data is spread over a larger frequency range. Thus, the concentration of the energy is no longer at substantially a single frequency, but rather spread over a frequency range dictated by the modulation. This may have the beneficial result of reducing EMI.

Figure 2C:
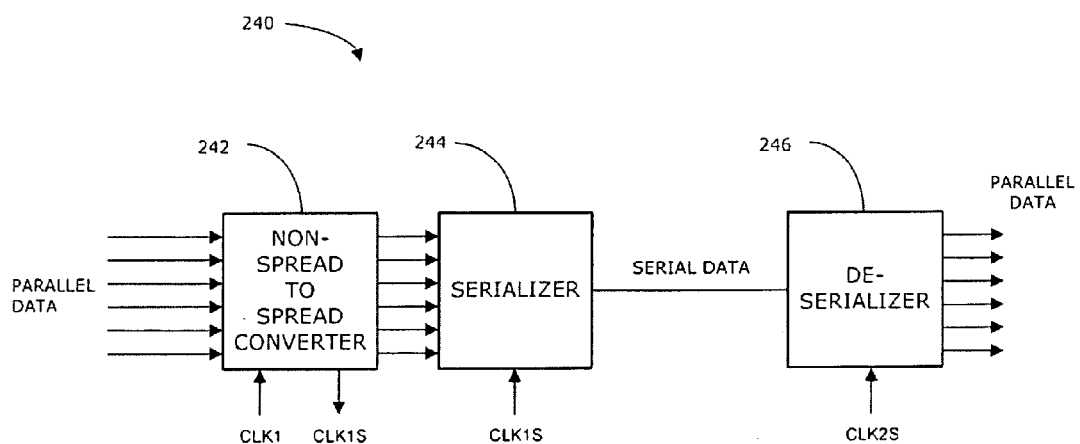
FIG. 2C illustrates a block diagram of another exemplary serial/deserializer (Ser/Des) communication system in accordance with another embodiment of the invention.

FIG. 2C illustrates a block diagram of another exemplary Ser/Des communication system 240 in accordance with an embodiment of the invention. In the previous embodiment 220, the non-spread to spread converter 226 was employed at the data receiving side. It shall be understood that such converter may be employed at the data transmitting side, as discussed with reference to the current embodiment 240.

In particular, the Ser/Des communication system 240 comprises a non-spread to spread converter 242 and a serializer 244 both at a data transmitting side, and a deserializer 246 at a data receiving side. The converter 242 uses a substantially constant frequency (non-spread) clock signal CLK1 to receive parallel data in a non-spread domain, and a frequency modulated (spread) clock signal CLK1S to transmit parallel data in a spread domain to a the serializer 244. The serializer 244, in turn, uses the spread clock signal CLK1S to convert the parallel data to serial data. The serial data is then transmitted to the deserializer 246 at the data receiving side. The deserializer 246 receives and converts the serial data back to parallel data using another spread clock signal CLK2S. The frequency modulation of the spread clock signal CLK2S of the deserializer 246 may be substantially the same as the frequency modulation of the spread clock signal CLK1S of the serializer 244.

Figure 3:
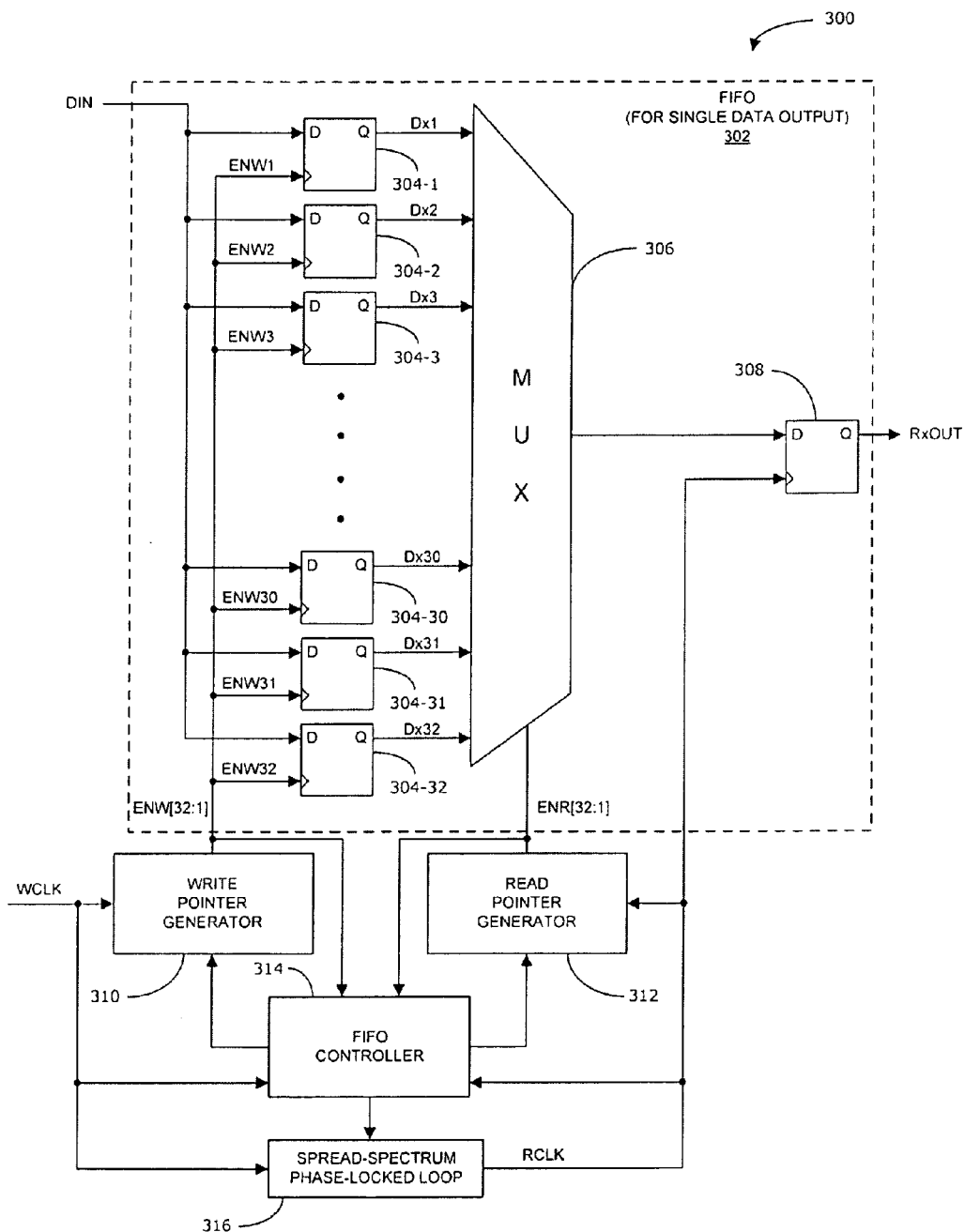
FIG. 3 illustrates a block diagram of an exemplary apparatus for transferring data in a non-spread clock domain to a spread clock domain in accordance with another embodiment of the invention.

FIG. 3 illustrates a block diagram of an exemplary apparatus 300 for transferring data in a non-spread clock domain to a spread clock domain in accordance with another embodiment of the invention. The apparatus 300 may be an exemplary detailed implementation of the non-spread to spread domain converter 206 previously discussed. The apparatus 300 comprises a plurality of first-in-first-out (FIFO) memory devices 302, one for each bit of parallel data. For simplicity purposes, only one FIFO memory device is shown. The apparatus 300 further comprises a write pointer generator 310, a read pointer generator 312, a FIFO controller 314, and a spread-spectrum phase-locked loop 316.

The FIFO device 302, in turn, comprises a plurality of input flip-flops 304-1 through 304-32, a multiplexer (MUX) 306, and an output flip-flop 308. The data (D) inputs of the input flip-flops 304-1-32 are configured to receive the corresponding data from one parallel line of the output of the deserializer 204. The clock inputs of the input flip-flops 304-1-32 are configured to respectively receive the write pointer outputs ENW-1-32 of the write pointer generator 310. The Q-outputs of the input flip-flops 304-1-32 are coupled to respective inputs of the MUX 306. The MUX 306, in turn, includes a select input adapted to receive the read pointer ENR[32:1] of the read pointer generator 312. The output of the MUX 306 is coupled to the data (D) input of the output flip-flop 308. The clock input of the output flip-flop 308 is configured to receive a spread clock signal RCLK from the output of the spread-spectrum phase-locked loop 316. The corresponding bit of the parallel data output is generated at the Q-output of the output flip-flop 308. Although, in this example, the size of the FIFO 302 is 32, it shall be understood that the size should be selected to accommodate peak phase swing "A," as described in more detail with reference to FIG. 4. The peak phase swing A depends on the modulation frequency, spread amount, and center frequency of the spread clock RCLK.

The write pointer generator 310 generates the write pointer ENW[32:1] for the respective clock inputs of the input flip-flops 304-1-32 in response to a clock signal WCLK. The clock signal WCLK is the non-spread clock signal and has a frequency substantially the same as the constant frequency of the clock signal CLK2 of the deserializer 204. As discussed in more detail below, the spread-spectrum phase-locked loop 316 generates the spread clock signal RCLK from the non-spread clock signal WCLK based on a control signal from the output of the FIFO controller 314. The spread clock RCLK generated should be center spread, but any substantially symmetrical profile may be employed. The read pointer generator 312 generates the read pointer ENR[32:1] in response to the spread clock signal RCLK. The FIFO controller 314 generates the control signal for the spread-spectrum phase-locked loop 316 in response to the write ENW[32:1] and read ENR [32:1] pointers generated by the write pointer generator 310 and the read pointer generator 312, respectively.

The operation of the system 300 will now be discussed. The write pointer generator 310 generates the write pointer ENW [32:1] to strobe data from the input DIN to the respective Q-outputs of the input flip-flops 304-1-32 in a cyclic manner. That is, in a first cycle, the write pointer generator 310 may generate a rising edge in ENW1 to strobe a first data at the input DIN to the Q-output of input flip-flop 304-1. In the second cycle, the write pointer generator 310 may generate a rising edge in ENW2 to strobe a second data at the input DIN to the Q-output of input flip-flop 304-2. In the third cycle, the write pointer generator 310 may generate a rising edge in ENW3 to strobe a third data at the input DIN to the Q-output of input flip-flop 304-3. This process continues until the write pointer generator 310 generates a rising edge in ENW32 to strobe data at the input DIN to the Q-output of input flip-flop 304-32, and then the process repeats again by strobing a subsequent data to the Q-output of the flip-flop 304-1. Since the write pointer generator 310 is responsive to a substantially constant frequency clock signal WCLK, data are strobe to the outputs of the input flip-flops 304-1-32 in a substantially constant rate.

The read pointer generator 312 generates read pointer ENR [32:1], along with the spread clock signal RCLK, to strobe data from the inputs of the MUX 306 to the output of the output flip-flop 308 in a cyclic manner. That is, in a first cycle, the read pointer generator 312 may generate a pointer ENR1 to strobe a first data from the output of flip-flop 304-1 to the output of flip-flop 308. In the second cycle, the receiver pointer generator 312 may generate a pointer ENR2 to strobe a second data from the output of flip-flop 304-2 to the output of flip-flop 308. In the third cycle, the receiver pointer generator 312 may generate a pointer ENR3 to strobe a third data from the output of flip-flop 304-3 to the output of flip-flop 308. This process continues until the read pointer generator 312 generates a pointer ENR32 to strobe data from the output of flip-flop 304-32 to the output of flip-flop 308, and then the process repeats again by strobing a subsequent data from output of flip-flop 304-1 to the output of flip-flop 308.

In this case, the read pointer generator 310 and output flip-flop 308 is responsive to the spread clock signal RCLK. Since the spread clock signal RCLK may be modulated in the frequency domain, data are strobe to the output of flip-flops 308 at a rate that depends on the modulation. As an example, the write pointer generator 310 may strobe data to the respective outputs of flip-flops 304-1-32 at a rate of approximately 100 MHz (e.g., the frequency of WCLK). However, if a four (4) percent, center spread, symmetrical frequency modulation is applied to the spread clock signal RCLK, the read pointer generator 312 may strobe data to the output of flip-flop 308 at a rate that varies from 96 MHz to 104 MHz. As previously discussed, this results in the energy of the output data to be spread over a frequency range, which may result in the reduction of EMI.

For proper operation, the strobing of the data from the inputs of the MUX 306 to the output of flip-flop 308 lags the writing of the data from the input DIN to the respective outputs of the flip-flops 304-1-32. The amount of lag varies with the modulation applied to the spread clock RCLK. To minimize overflow or underflow conditions, the average lag or mid-lag of the read pointer ENR[32:1] to the write pointer ENW[32:1] should be half the size of the FIFO 302. For example, in this case, the size of the FIFO 302 is 32. Thus, the average lag or mid-lag of the read pointer ENR[32:1] to the write pointer ENW[32:1] should be 16. As an example, when the write pointer generator 310 strobes data from the input DIN to the output of input flip-flop 304-16, the read pointer generator 312 strobes data from the output of input flip-flop 304-1 to the output of flip-flop 308. However, because modulation is applied to the spread clock RCLK, the lag varies from less than 16 (e.g., 11) to more than 16 (e.g., 21). This is explained more with reference to the following example.

Figure 4:
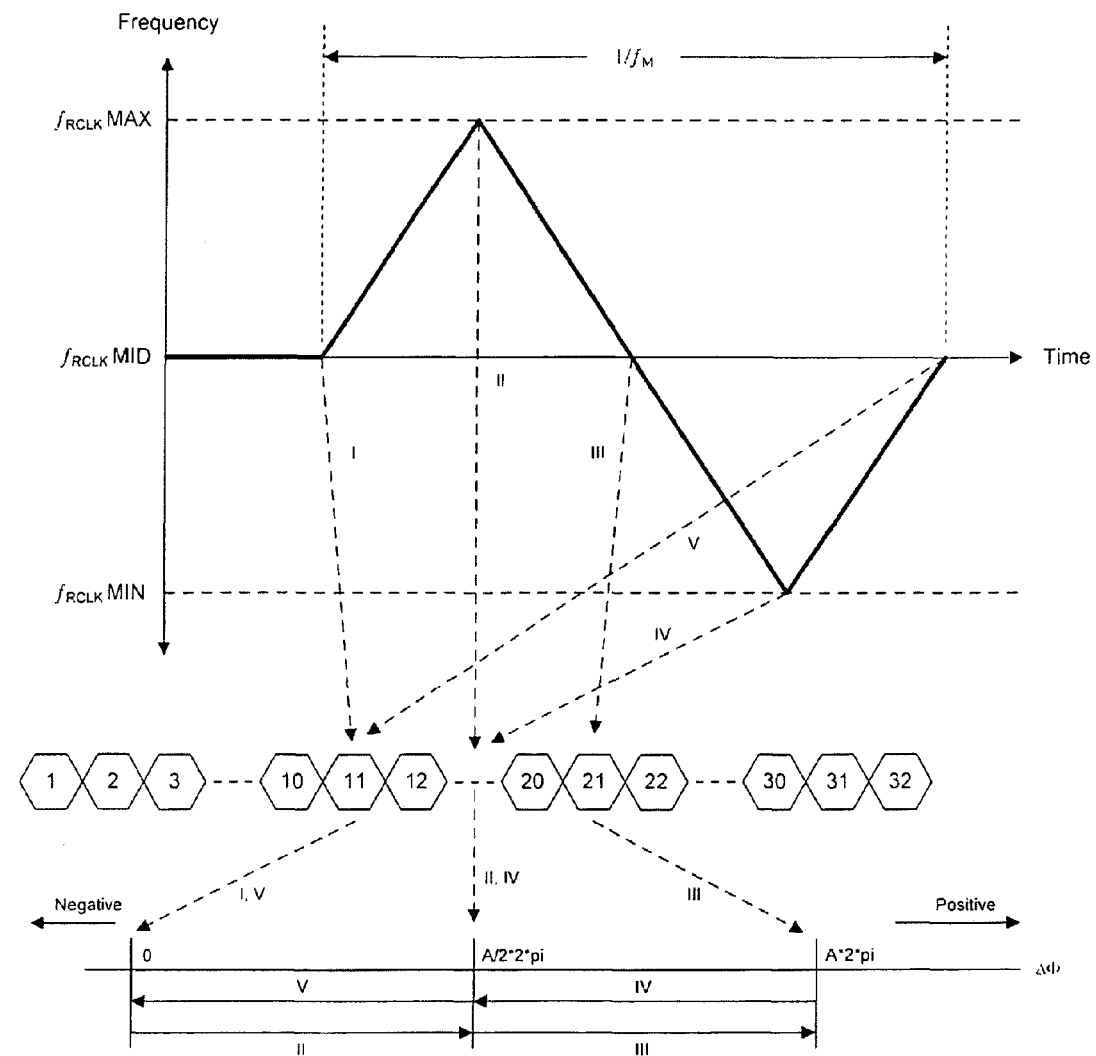
FIG. 4 illustrates a diagram of exemplary signals generated in the exemplary apparatus for transferring data in a non-spread clock domain to a spread clock domain in accordance with another embodiment of the invention.

FIG. 4 illustrates a diagram of exemplary signals generated in the exemplary apparatus 300 for transferring data in a non-spread clock domain to a spread clock domain in accordance with another embodiment of the invention. The top portion of the diagram illustrates a graph of the frequency of the spread clock signal RCLK as it varies with time. Although this is one example of a spread clock, any center spread profile could be employed. The polygons with the numbers ranging from 1 to 32 represents the lag of the read pointer ENR[32:1] to the write pointer ENW[32:1]. An example of a lag is when data is written to flip-flip 304-1, data is read from flip-flip 304-16. Thus, the lag is 16. The upper set of arrows with corresponding Roman numerals points to the respective lags of the read pointer ENR[32:1] to the write pointer ENW[32: 1] for corresponding frequencies of the spread clock signal RCLK. The bottom diagram represents the phase of the spread clock signal RCLK with respect to the non-spread clock signal WCLK. The lower set of arrows with corresponding Roman numerals points to the respective phases of the frequency modulation of the spread clock signal RCLK for corresponding lags of the read pointer ENR[32:1] to the write pointer ENW[32:1].

As the top diagram illustrates, the frequency of the spread clock signal RCLK is initially set to approximately the center of the frequency modulation swing $f_{RCLK}$ MID. For instance, when the spread is enabled, the FIFO 302 should be initialized properly. If FIFO is activated as soon as spread is enabled, after spread PLL locks to clock signal WCLK, initialization of write pointer to position one (1) necessitates initializing the read pointer to the left of middle flip-flop by A/2 (if FIFO size N, initialize to N/2−A/2). If spread amount or FM is programmable, FIFO 302 initialization should be programmable since A changes. Alternatively, if FIFO is turned on when spread profile reaches to positive peak, initializing write pointer to position one (1), while initializing the read pointer to the middle position would be preferred, for all spread amounts and modulation frequencies.

As an example, as indicated by the upper arrow labeled with Roman numeral I, the initial lag of the read pointer ENR[32:1] to the write pointer ENW[32:1] is 11, and it corresponds to when the frequency of the spread clock signal RCLK is approximately at center of the frequency modulation swing $f_{RCLK}$ MID. As the frequency of the spread clock signal RCLK increases to the maximum frequency $f_{RCLK}$ MAX according to the modulation, the lag of the read pointer ENR[32:1] to the write pointer ENW[32:1] increases from 11 to 16, as indicated by the upper arrow labeled with Roman numeral II. Note, that when the frequency of the spread clock signal RCLK is maximum, the lag is half of the size of the FIFO (e.g., 16). Thus, as discussed above, an initialization method entails the FIFO controller 314 sensing when the frequency of spread clock signal RCLK is substantially maximum, and then initializing the read pointer such that the lag between the read and write pointers is half the FIFO size (e.g., 16). As an example, at initialization, the pointers are initialized such that the write pointer generator 310 writes data to flip-flip 304-1, and the read pointer generator 312 reads data from flip-flip 304-17 (e.g., the lag is 16 (17-1), or half the FIFO size).

As the frequency of the spread clock signal RCLK decreases from the maximum frequency $f_{RCLK}$ MAX to the center frequency $f_{RCLK}$ MID according to the modulation, the lag of the read pointer ENR[32:1] to the write pointer ENW[32:1] increases from 16 to 21, as indicated by the upper arrow labeled with Roman numeral III. As the frequency of the spread clock signal RCLK continues to decrease from the center frequency $f_{RCLK}$ MID to the minimum frequency $f_{RCLK}$ MIN according to the modulation frequency swing, the lag of the read pointer ENR[32:1] to the write pointer ENW[32:1] decreases from 21 to 16, as indicated by the upper arrow labeled with Roman numeral IV.

As the frequency of the spread clock signal RCLK increases again from the minimum frequency $f_{RCLK}$ MIN to the center frequency $f_{RCLK}$ MID according to the modulation, the lag of the read pointer ENR[32:1] to the write pointer ENW[32:1] decreases from 16 back to 11, as indicated by the upper arrow labeled with Roman numeral V. As this diagram illustrates, the lag of the read pointer ENR[32:1] to the write pointer ENW[32:1] varies between 11 and 21. Thus, the variation in the lag is centered about 16, which is the center of the input of the MUX 306. In normal operation, this ensures that data is not lost due to overflow when the lag becomes zero (0) or underflow when the lag becomes 32, by leaving equal/balanced margins on both sides and maximizing setup/hold times for flip-flop 308.

As previously discussed, the bottom diagram illustrates the phase of the frequency modulation of the spread clock RCLK. As shown, the lower arrows labeled with Roman numerals I and V indicate that when the lag between the read pointer ENR[32:1] and the write pointer ENW[32:1] is at 11, the phase of the frequency modulation of the spread clock RCLK relative to phase of clock signal WCLK is zero (0). The lower arrows labeled with Roman numerals II and IV indicate that when the lag between the read pointer ENR[32:1] and the write pointer ENW[32:1] is at 16, the phase of the frequency modulation of the spread clock RCLK relative to phase of clock signal WCLK is A/2*2*pi. And, the lower arrow labeled with Roman numeral III indicates that when the lag between the read pointer ENR[32:1] and the write pointer ENW[32:1] relative to phase of clock signal WCLK is at 21, the phase of the frequency modulation of the spread clock RCLK is A*2*pi. The symbol A is the peak phase swing, and for a triangular modulation may be given as follows: $A=f_{WCLK}*s/(4*f_M)$, where $f_{WCLK}$ is the frequency of the non-spread clock signal WCLK, s is the modulation spread (e.g., s=0.04 for ±4% spread), and $f_M$ is the modulation frequency.

Figure 5A:
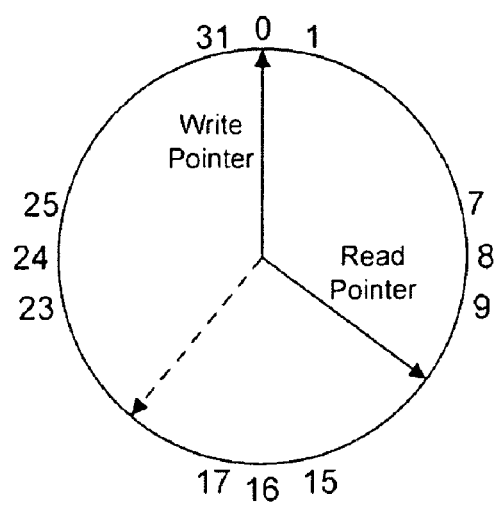
FIG. 5A illustrates a diagram of exemplary relative phases of the write and read pointers in a normal operation in accordance with another embodiment of the invention.

FIG. 5A illustrates a diagram of exemplary relative phases of the write and read pointers in a normal operation in accordance with another embodiment of the invention. In this example, the write pointer is set to reference phase zero (0). As noted, during normal operations, the lag between the read pointer ENR[32:1] and the write pointer ENW[32:1] varies from 11 to 21, with 16 being the medium of the range. However, often the system 300 may be subjected to systematic noise or interference that may deviate the read pointer and/or the write pointer from normal operations. This may cause the lower end of the lag range to draw closer to the write pointer where an overflow situation may occur (e.g., when the read pointer and write pointer collide). Alternatively, the systematic noise or interference may cause the upper end of the lag range to draw closer to the write pointer where an underflow situation may occur (e.g., when the read pointer and write pointer collide). In both underflow and overflow situations, loss of data may occur, which should be prevented.

Figure 5B:
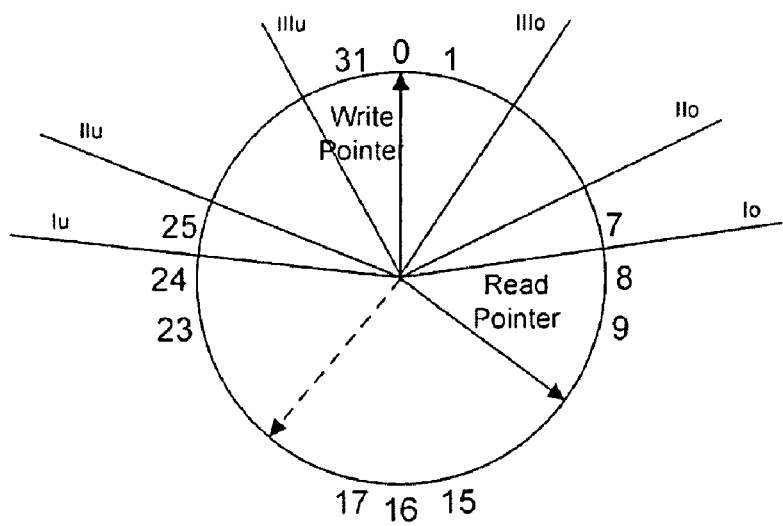
FIG. 5B illustrates a diagram of exemplary relative phases of the write and read pointers including correction thresholds in accordance with another embodiment of the invention.

FIG. 5B illustrates a diagram of exemplary relative phases of the write and read pointers including correction thresholds in accordance with another embodiment of the invention. In this example, three correction thresholds $I_O$, $II_O$, and $III_O$ are established to deal with potentially overflow situations, and three correction thresholds $I_U$, $II_U$, and $III_U$ are established to deal with potentially underflow situations. The FIFO controller 314 monitors the write and read pointers generated respectively by the write pointer generator 310 and read pointer generator 312, and determines whether the read pointer crosses any of these thresholds. If it does, the FIFO controller 314 sends a control signal to the spread-spectrum phase-locked loop 316 to adjust the frequency of the spread clock signal RCLK to correct the potentially overflow or underflow situation.

For example, if the FIFO controller 314 determines that the read pointer crosses the threshold $I_O$, which may mean that the lag of the read pointer to the write pointer is varying between 7 and 17 instead of the normal lag range of 11 to 21, the controller 314 causes the spread-spectrum phase-locked loop 316 to add DC frequency offset to the frequency of the spread clock signal RCLK to attempt to position the lag range to its normal range. If, even after applying this correction, the read pointer crosses the next threshold $II_O$, which may mean that the lag of the read pointer to the write pointer is varying between 5 and 15, the controller 314 causes the spread-spectrum phase-locked loop 316 to further add DC frequency offset to increase the frequency of the spread clock signal RCLK to attempt to position the lag range to its normal range. Similarly, if, even after applying the second correction, the read pointer crosses the third threshold $III_O$, which may mean that the lag of the read pointer to the write pointer is varying between 3 and 13, the controller 314 causes the spread-spectrum phase-locked loop 316 to further add DC frequency offset to increase the frequency of the spread clock signal RCLK to attempt to position the lag range to its normal range.

The correction for potential underflow works in the same fashion as the correction for potential overflow, except in the opposite direction. For instance, if the FIFO controller 314 determines that the read pointer crosses the threshold $I_U$, which may mean that the lag of the read pointer to the write pointer is varying between 15 and 25 instead of the normal lag range of 11 to 21, the controller 314 causes the spread-spectrum phase-locked loop 316 to subtract DC frequency offset to decrease the frequency of the spread clock signal RCLK to attempt to position the lag range to its normal range. If, even after applying this correction, the read pointer crosses the next threshold IIu, which may mean that the lag of the read pointer to the write pointer is varying between 17 and 27, the controller 314 causes the spread-spectrum phase-locked loop 316 to further subtract DC frequency offset to decrease the frequency of the spread clock signal RCLK to attempt to position the lag range to its normal range. Similarly, if, even after applying the second correction, the read pointer crosses the third threshold $III_U$, which may mean that the lag of the read pointer to the write pointer is varying between 20 and 30, the controller 314 causes the spread-spectrum phase-locked loop 316 to further subtract DC frequency offset to decrease the frequency of the spread clock signal RCLK to attempt to position the lag range to its normal range.

Figure 6A:
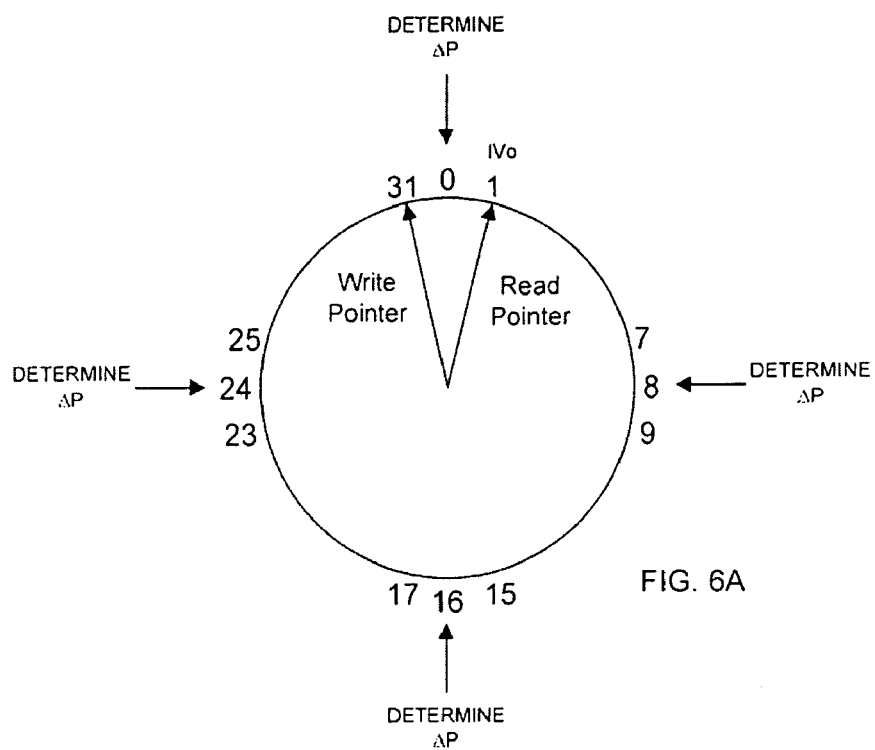
FIG. 6A illustrates a diagram of exemplary relative phases of the write and read pointers including an overflow reset threshold in accordance with another embodiment of the invention.

FIG. 6A illustrates a diagram of exemplary relative phases of the write and read pointers including an overflow reset threshold in accordance with another embodiment of the invention. As previously discussed, an overflow situation occurs when the lag between the read pointer and the write pointer reaches zero (0). When this occurs, loss of data is inevitable. Thus, if this situation is about to occur, it would be better to just reset the system, instead of continuing to apply corrections. Accordingly, the FIFO controller 314 monitors the write and read pointers generated respectively by the write pointer generator 310 and read pointer generator 312, and determines whether the read pointer crosses the overflow reset threshold $IV_O$. If it does, the FIFO controller 314 sends a control signal to the write pointer generator 310, read pointer generator 312, and the spread-spectrum phase-locked loop 316 to reset the operation. Also noted, the FIFO controller 314 may determine the read and write pointer positions every eight (8) cycles, in order to prevent loss of data if the read pointer falls quickly to an overflow situation.

Figure 6B:
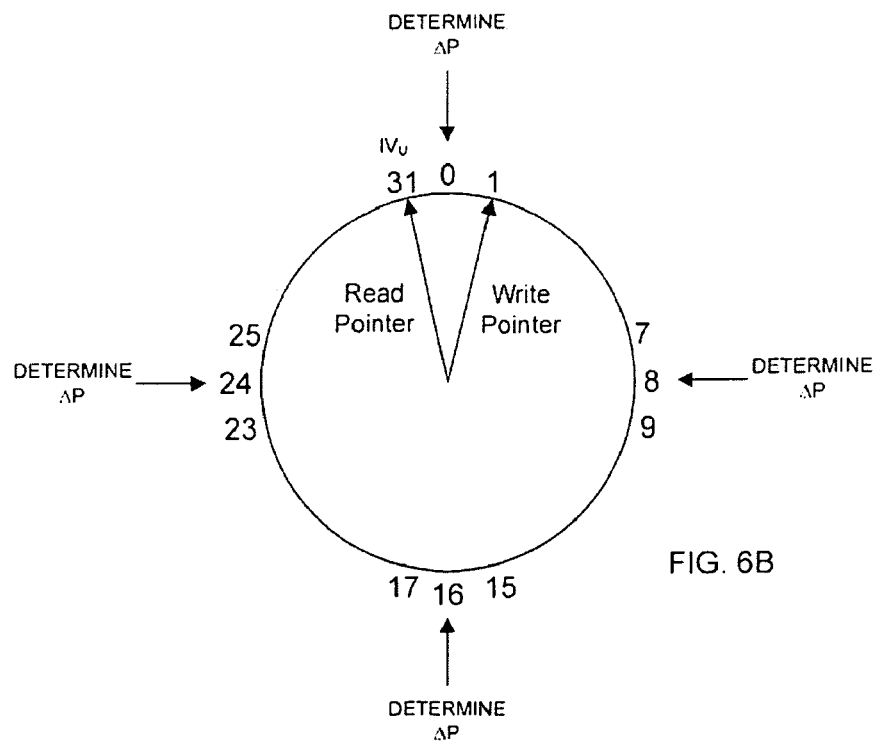
FIG. 6B illustrates a diagram of exemplary relative phases of the write and read pointers including an underflow reset threshold in accordance with another embodiment of the invention.

FIG. 6B illustrates a diagram of exemplary relative phases of the write and read pointers including an underflow reset threshold in accordance with another embodiment of the invention. As previously discussed, an underflow situation occurs when the lag between the read pointer and the write pointer reaches the max size of the MUX 306 (e.g., 32). When this occurs, loss of data is inevitable. Thus, if this situation is about to occur, it would be better to just reset the system, instead of continuing to apply corrections. Accordingly, the FIFO controller 314 monitors the write and read pointers generated respectively by the write pointer generator 310 and read pointer generator 312, and determines whether the read pointer crosses the underflow reset threshold $IV_U$. If it does, the FIFO controller 314 sends a control signal to the write pointer generator 310, read pointer generator 312, and the spread-spectrum phase-locked loop 316 to reset the operation. Also noted, the FIFO controller 314 may determine the read and write pointer positions every eight (8) cycles, in order to prevent loss of data if the read pointer rises quickly to an underflow situation.

Figure 7A:
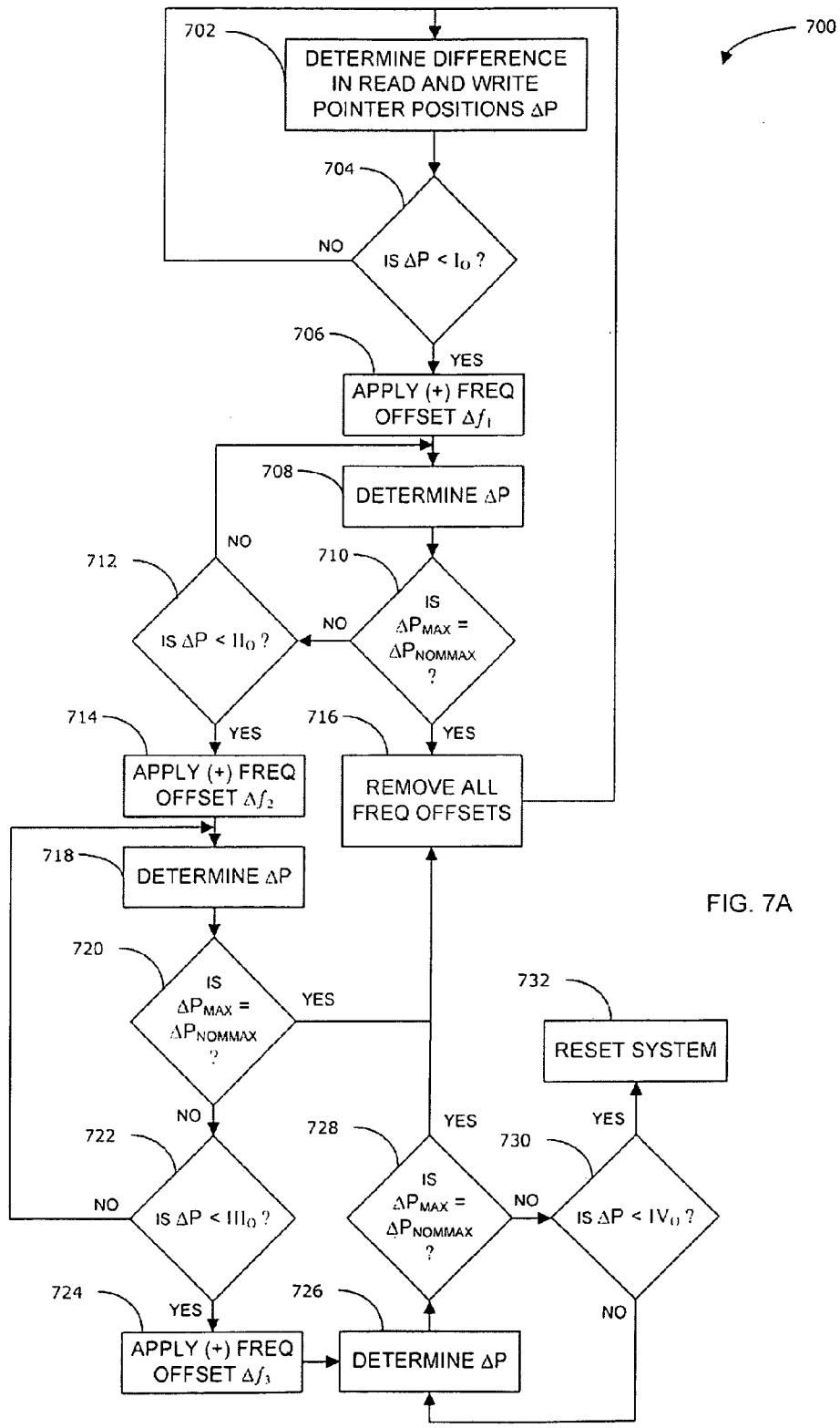
FIG. 7A illustrates a flow diagram of an exemplary method of responding to a potential overflow situation in accordance with another embodiment of the invention.

FIG. 7A illustrates a flow diagram of an exemplary method 700 of responding to a potential overflow situation in accordance with another embodiment of the invention. The method 700 may be implemented by the FIFO controller 314. According to the method 700, the controller 314 determines the difference ΔP in the read and write pointer positions (block 702). The controller 314 then determines whether the lag or read and write pointer difference ΔP is less than the first overflow correction threshold $I_O$ (block 704). If it is not, the controller 314 takes another measurement of the lag or read and write pointer difference ΔP per block 702. If, on the other hand, the controller 314 determines that the lag ΔP is less than the threshold $I_O$, the controller 314 sends a control signal to the spread-spectrum phase-locked loop 316 to apply a positive (+) frequency offset $\Delta f_1$ to the frequency $f_{RCLK}$ of the spread clock signal RCLK (block 706).

The controller 314 then takes another measurement of the lag or read and write pointer difference ΔP (block 708). The controller 314 then determines whether the read and write pointer lag range has returned to normal by assessing whether the maximum lag $\Delta P_{MAX}$ is equal to the normal range maximum lag $\Delta P_{NOMMAX}$ (block 710). If the controller 314 determines that the read and write pointer lag range has returned to normal, the controller 314 sends a control signal to the spread-spectrum phase-locked loop 316 to remove all positive (+) frequency offset(s) from the frequency $f_{RCLK}$ of the spread clock signal RCLK (block 716), and continues on to block 702. Otherwise, the controller 314 determines whether the read and write pointer lag ΔP is less than the second overflow correction threshold $II_O$ (block 712). If the controller 314 determines that the lag ΔP is not less than the threshold $II_O$, the controller 314 takes another measurement of the read and write pointer lag ΔP per block 708, and continues on to block 710. If, on the other hand, the controller 314 determines that the read and write pointer lag ΔP is less than the second threshold $II_O$ (e.g., the overflow potential has become worse), the controller 314 then sends a control signal to the spread-spectrum phase-locked loop 316 to add more positive (+) frequency offset $\Delta f_2$ to the frequency $f_{RCLK}$ of the spread clock signal RCLK (block 714).

The controller 314 then takes another measurement of the lag or read and write pointer difference ΔP (block 718). The controller 314 then determines whether the read and write pointer lag range has returned to normal by assessing whether the maximum lag $\Delta P_{MAX}$ is equal to the normal range maximum lag $\Delta P_{NOMMAX}$ (block 720). If the controller 314 determines that the read and write pointer lag range has returned to normal, the controller 314 sends a control signal to the spread-spectrum phase-locked loop 316 to remove all positive (+) frequency offset(s) from the frequency $f_{RCLK}$ of the spread clock signal RCLK (block 716), and continues on to block 702. Otherwise, the controller 314 determines whether the read and write pointer lag ΔP is less than the third overflow correction threshold $III_O$ (block 722). If the controller 314 determines that the lag ΔP is not less than the threshold $III_O$, the controller 314 takes another measurement of the read and write pointer lag ΔP per block 718, and continues on to block 720. If, on the other hand, the controller 314 determines that the read and write pointer lag ΔP is less than the third threshold $III_O$ (e.g., the overflow potential has become even worse), the controller 314 then sends a control signal to the spread-spectrum phase-locked loop 316 to add more positive (+) frequency offset $\Delta f_3$ to the frequency $f_{RCLK}$ of the spread clock signal RCLK again (block 724).

The controller 314 then takes another measurement of the lag or read and write pointer difference ΔP (block 726). The controller 314 then determines whether the read and write pointer lag range has returned to normal by assessing whether the maximum lag $\Delta P_{MAX}$ is equal to the normal range maximum lag $\Delta P_{NOMMAX}$ (block 728). If the controller 314 determines that the read and write pointer lag range has returned to normal, the controller 314 sends a control signal to the spread-spectrum phase-locked loop 316 to remove all positive (+) frequency offset(s) from the frequency $f_{RCLK}$ of the spread clock signal RCLK (block 716), and continues on to block 702. Otherwise, the controller 314 determines whether the read and write pointer lag ΔP is less than the overflow reset threshold $IV_O$ (block 730). If the controller 314 determines that the lag ΔP is not less than the reset threshold $IV_O$, the controller 314 takes another measurement of the read and write pointer lag ΔP per block 726, and continues on to block 728. If, on the other hand, the controller 314 determines that the read and write pointer lag ΔP is less than the reset threshold $IV_O$ (e.g., corrections are not improving the overflow situation), the controller 314 then sends a reset control signal to the write pointer generator 310, read pointer generator 312, and the spread-spectrum phase-locked loop 316 (block 732). It shall be understood that frequency offsets $\Delta f_1$, $\Delta f_2$, and $\Delta f_3$ may be the same or different, and may be static or dynamic.

Figure 7B:
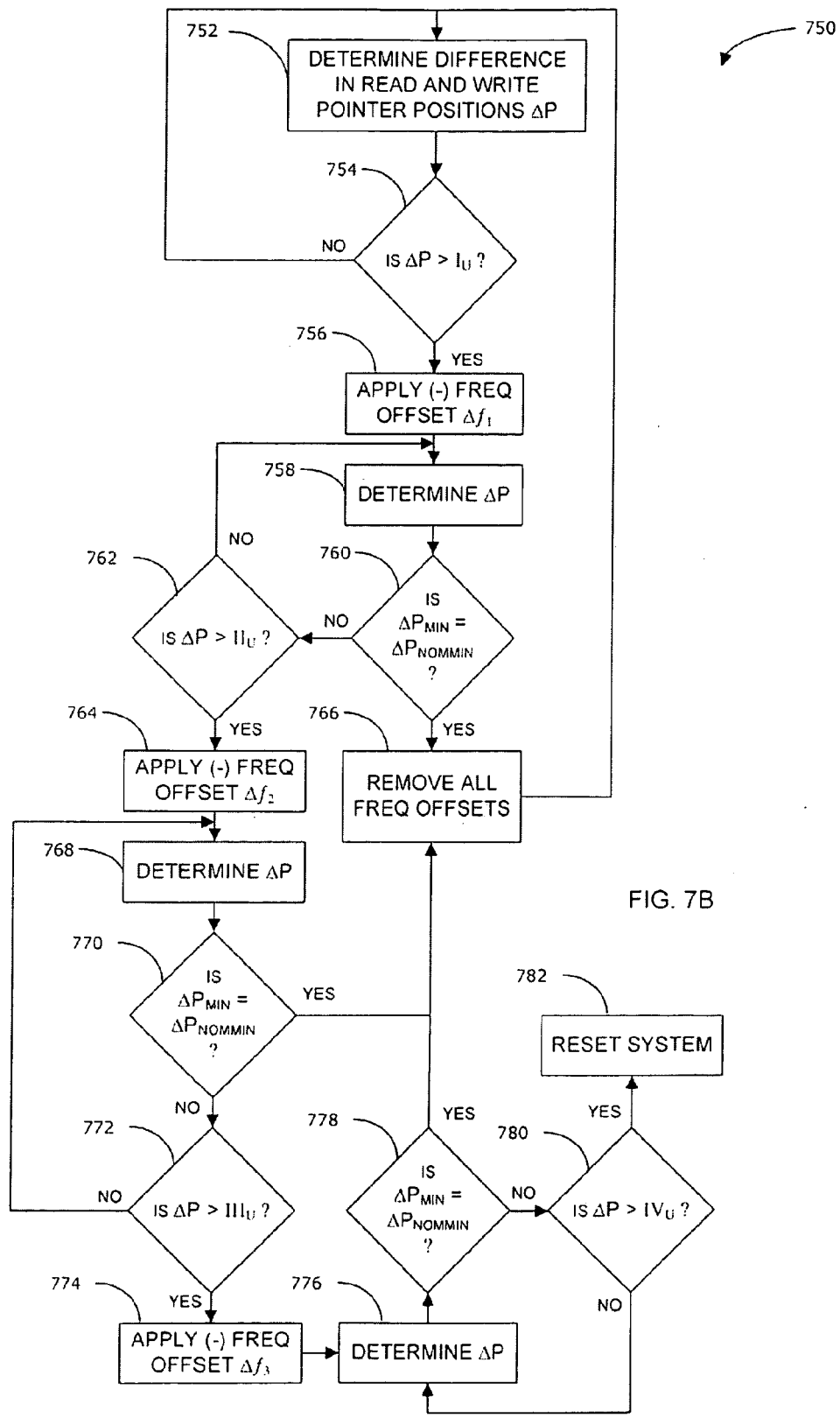
FIG. 7B illustrates a flow diagram of an exemplary method of responding to a potential underflow situation in accordance with another embodiment of the invention.

FIG. 7B illustrates a flow diagram of exemplary method 750 of responding to a potential underflow situation in accordance with another embodiment of the invention. The underflow correction method 750 is similar to the overflow correction method 700 previously discussed. However, for the sake of completeness, the method 750 is discussed fully below. The method 700 may be implemented by the FIFO controller 314, simultaneously with the overflow correction method 700.

According to the method 750, the controller 314 determines the difference ΔP in the read and write pointer positions (block 752). The controller 314 then determines whether the lag ΔP is greater than the first underflow correction threshold $I_U$ (block 754). If it is not, the controller 314 takes another measurement of the lag ΔP per block 752. If, on the other hand, the controller 314 determines that the lag ΔP is greater than the threshold $I_U$, the controller 314 sends a control signal to the spread-spectrum phase-locked loop 316 to add a negative (−) frequency offset $\Delta f_1$ to the frequency $f_{RCLK}$ of the spread clock signal RCLK (block 756).

The controller 314 then takes another measurement of the read and write pointer lag ΔP (block 758). The controller 314 then determines whether the read and write pointer lag range has returned to normal by assessing whether the minimum lag $\Delta P_{MIN}$ is equal to the normal range minimum lag $\Delta P_{NOMMIN}$ (block 760). If the controller 314 determines that the read and write pointer lag range has returned to normal, the controller 314 sends a control signal to the spread-spectrum phase-locked loop 316 to remove all negative (−) frequency offset(s) from the frequency $f_{RCLK}$ of the spread clock signal RCLK (block 766), and continues on to block 752. Otherwise, the controller 314 determines whether the read and write pointer lag ΔP is greater than the second underflow correction threshold $II_U$ (block 762). If the controller 314 determines that the lag ΔP is not greater than the threshold $II_U$, the controller 314 takes another measurement of the read and write pointer lag ΔP per block 758, and continues on to block 760. If, on the other hand, the controller 314 determines that the read and write pointer lag ΔP is greater than the second threshold $II_U$ (e.g., the underflow potential has become worse), the controller 314 then sends a control signal to the spread-spectrum phase-locked loop 316 to add more negative (−) frequency offset $\Delta f_2$ to the frequency $f_{RCLK}$ of the spread clock signal RCLK again (block 764).

The controller 314 then takes another measurement of the lag or read and write pointer difference ΔP (block 768). The controller 314 then determines whether the read and write pointer lag range has returned to normal by assessing whether the minimum lag $\Delta P_{MIN}$ is equal to the normal range minimum lag $\Delta P_{NOMMIN}$ (block 770). If the controller 314 determines that the read and write pointer lag range has returned to normal, the controller 314 sends a control signal to the spread-spectrum phase-locked loop 316 to remove all negative (−) frequency offset(s) from the frequency $f_{RCLK}$ of the spread clock signal RCLK (block 766), and continues on to block 752. Otherwise, the controller 314 determines whether the read and write pointer lag ΔP is greater than the third under correction threshold $III_U$ (block 772). If the controller 314 determines that the lag ΔP is not greater than the threshold $III_U$, the controller 314 takes another measurement of the read and write pointer lag ΔP per block 768, and continues on to block 770. If, on the other hand, the controller 314 determines that the read and write pointer lag ΔP is greater than the third threshold $III_U$ (e.g., the underflow potential has become even worse), the controller 314 then sends a control signal to the spread-spectrum phase-locked loop 316 to add more negative (−) frequency offset $\Delta f_3$ to the frequency $f_{RCLK}$ of the spread clock signal RCLK (block 774).

The controller 314 then takes another measurement of the lag or read and write pointer difference ΔP (block 776). The controller 314 then determines whether the read and write pointer lag range has returned to normal by assessing whether the minimum lag $\Delta P_{MIN}$ is equal to the normal range minimum lag $\Delta P_{NOMMIN}$ (block 778). If the controller 314 determines that the read and write pointer lag range has returned to normal, the controller 314 sends a control signal to the spread-spectrum phase-locked loop 316 to remove all negative (−) frequency offset(s) from the frequency $f_{RCLK}$ of the spread clock signal RCLK (block 766), and continues on to block 752. Otherwise, the controller 314 determines whether the read and write pointer lag ΔP is greater than the underflow reset threshold $IV_U$ (block 780). If the controller 314 determines that the lag ΔP is not greater than the reset threshold $IV_U$, the controller 314 takes another measurement of the read and write pointer lag ΔP per block 776, and continues on to block 778. If, on the other hand, the controller 314 determines that the read and write pointer lag ΔP is greater than the reset threshold $IV_U$ (e.g., corrections are not improving the underflow situation), the controller 314 then sends a reset control signal to the write pointer generator 310, read pointer generator 312, and the spread-spectrum phase-locked loop 316 (block 782). It shall be understood that frequency offsets $\Delta f_1$, $\Delta f_2$, and $\Delta f_3$ may be the same or different, and may be static or dynamic.

Figure 8A:
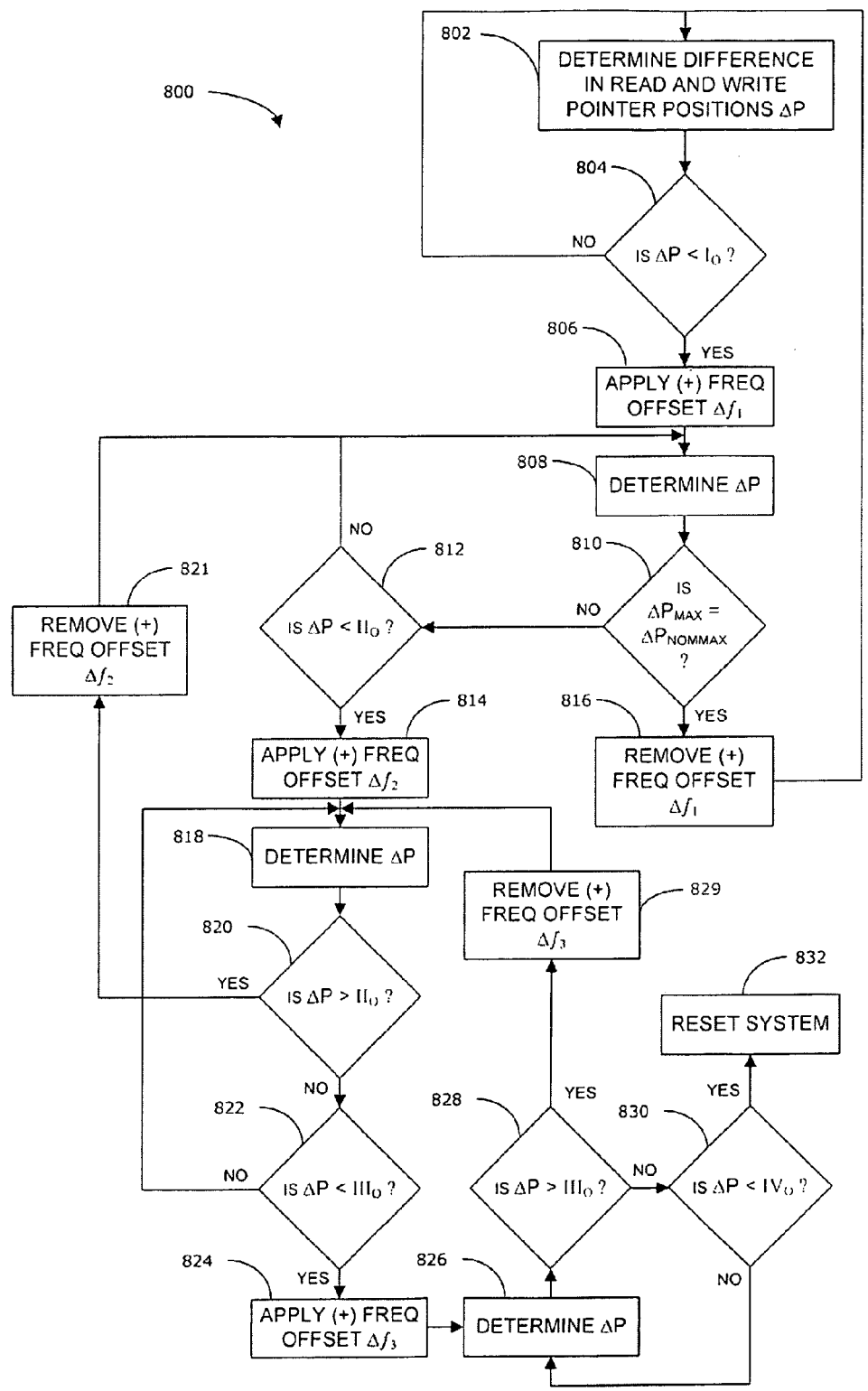
FIG. 8A illustrates a flow diagram of another exemplary method of responding to a potential overflow situation in accordance with another embodiment of the invention

FIG. 8A illustrates a flow diagram of another exemplary method 800 of responding to a potential overflow situation in accordance with another embodiment of the invention. The method 800 may be implemented by the FIFO controller 314. According to the method 800, the controller 314 determines the difference ΔP in the read and write pointer positions (block 802). The controller 314 then determines whether the lag or read and write pointer difference ΔP is less than the first overflow correction threshold $I_O$ (block 804). If it is not, the controller 314 takes another measurement of the lag or read and write pointer difference ΔP per block 802. If, on the other hand, the controller 314 determines that the lag ΔP is less than the threshold $I_O$, the controller 314 sends a control signal to the spread-spectrum phase-locked loop 316 to add a positive (+) frequency offset $\Delta f_1$ to the frequency $f_{RCLK}$ of the spread clock signal RCLK (block 806).

The controller 314 then takes another measurement of the lag or read and write pointer difference ΔP (block 808). The controller 314 then determines whether the read and write pointer lag range has returned to normal by assessing whether the maximum lag $\Delta P_{MAX}$ is equal to the normal range maximum lag $\Delta P_{NOMMAX}$ (block 810). If the controller 314 determines that the read and write pointer lag range has returned to normal, the controller 314 sends a control signal to the spread-spectrum phase-locked loop 316 to remove the positive (+) frequency offset $\Delta f_1$ from the frequency $f_{RCLK}$ of the spread clock signal RCLK (block 816), and continues on to block 802. Otherwise, the controller 314 determines whether the read and write pointer lag ΔP is less than the second overflow correction threshold $II_O$ (block 812). If the controller 314 determines that the lag ΔP is not less than the threshold $II_O$, the controller 314 takes another measurement of the read and write pointer lag ΔP per block 808, and continues on to block 810. If, on the other hand, the controller 314 determines that the read and write pointer lag ΔP is less than the second threshold $II_O$ (e.g., the overflow potential has become worse), the controller 314 then sends a control signal to the spread-spectrum phase-locked loop 316 to add more positive (+)

frequency offset $\Delta f_2$ to the frequency $f_{RCLK}$ of the spread clock signal RCLK (block 814).

The controller 314 then takes another measurement of the lag or read and write pointer difference $\Delta P$ (block 818). The controller 314 then determines whether the lag $\Delta P$ is greater than the second overflow threshold $II_O$ (block 820). If the controller 314 determines that the lag $\Delta P$ is greater than the second overflow threshold $II_O$ (e.g., meaning that the potential overflow situation is improving), the controller 314 sends a control signal to the spread-spectrum phase-locked loop 316 to remove the positive (+) frequency offset $\Delta f_2$ from the frequency $f_{RCLK}$ of the spread clock signal RCLK (block 821), and continues on to block 808. Otherwise, the controller 314 determines whether the read and write pointer lag $\Delta P$ is less than the third overflow correction threshold $III_O$ (block 822). If the controller 314 determines that the lag $\Delta P$ is not less than the threshold $III_O$, the controller 314 takes another measurement of the read and write pointer lag $\Delta P$ per block 818, and continues on to block 820. If, on the other hand, the controller 314 determines that the read and write pointer lag $\Delta P$ is less than the third threshold $III_O$ (e.g., the overflow potential has become even worse), the controller 314 then sends a control signal to the spread-spectrum phase-locked loop 316 to add more positive (+) frequency offset $\Delta f_3$ to the frequency $f_{RCLK}$ of the spread clock signal RCLK (block 824).

The controller 314 then takes another measurement of the lag or read and write pointer difference $\Delta P$ (block 826). The controller 314 then determines whether the lag or read and write pointer difference $\Delta P$ is greater than the third threshold $III_O$ (block 828). If the controller 314 determines that the lag $\Delta P$ is greater than the third threshold $III_O$ (e.g., meaning that the potential overflow situation is improving), the controller 314 sends a control signal to the spread-spectrum phase-locked loop 316 to remove the positive (+) frequency offset $\Delta f_3$ from the frequency $f_{RCLK}$ of the spread clock signal RCLK (block 829), and continues on to block 818. Otherwise, the controller 314 determines whether the read and write pointer lag $\Delta P$ is less than the overflow reset threshold $IV_O$ (block 830). If the controller 314 determines that the lag $\Delta P$ is not less than the reset threshold $IV_O$, the controller 314 takes another measurement of the read and write pointer lag $\Delta P$ per block 826, and continues on to block 828. If, on the other hand, the controller 314 determines that the read and write pointer lag $\Delta P$ is less than the reset threshold $IV_O$ (e.g., corrections are not improving the overflow situation), the controller 314 then sends a reset control signal to the write pointer generator 310, read pointer generator 312, and the spread-spectrum phase-locked loop 316 (block 832). It shall be understood that frequency offsets $\Delta f_1$, $\Delta f_2$, and $\Delta f_3$ may be the same or different, and may be static or dynamic.

Figure 8B:
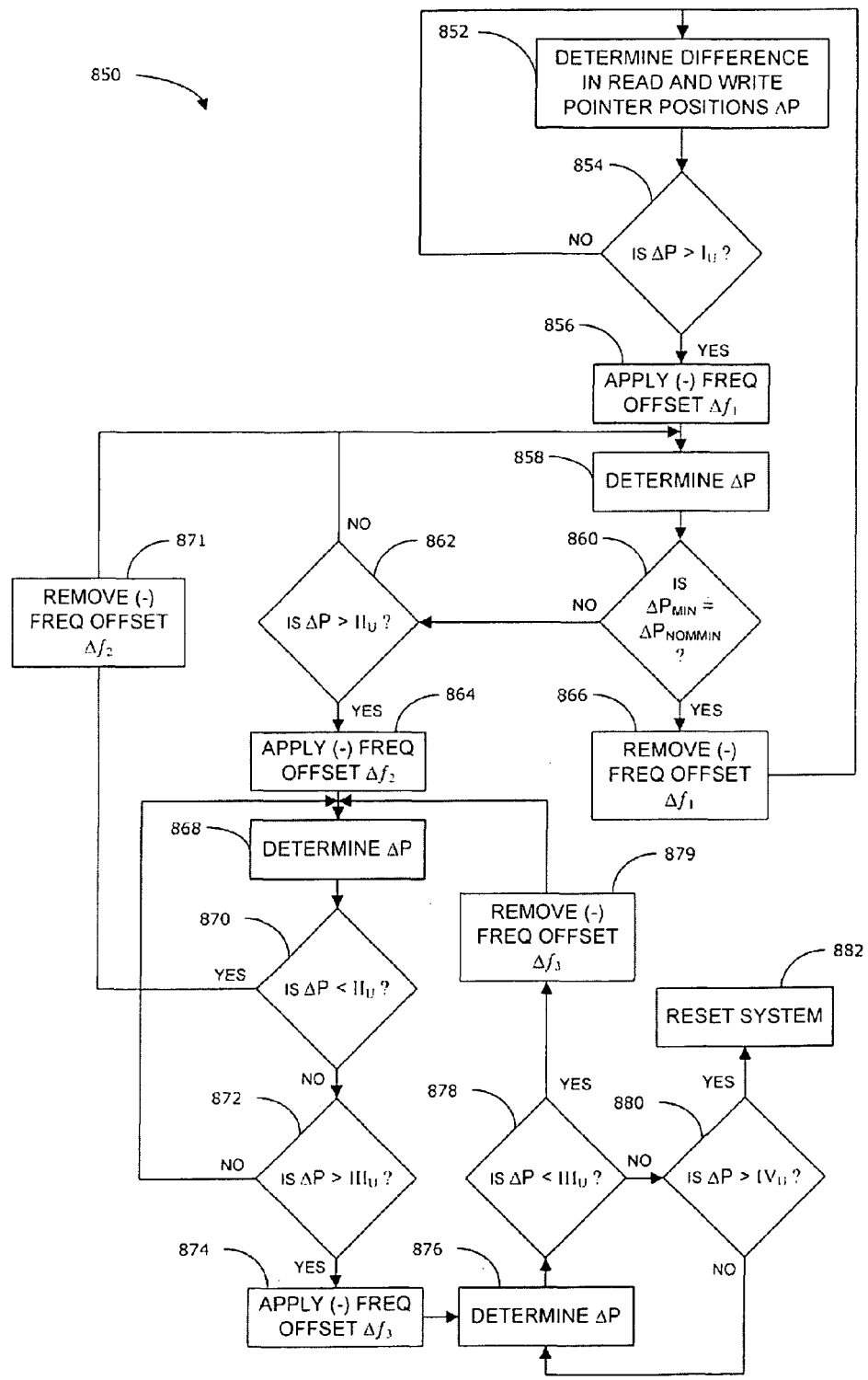
FIG. 8B illustrates a flow diagram of another exemplary method of responding to a potential underflow situation in accordance with another embodiment of the invention

FIG. 8B illustrates a flow diagram of another exemplary method 850 of responding to a potential underflow situation in accordance with another embodiment of the invention. The underflow correction method 850 is similar to the overflow correction method 800 previously discussed. However, for the sake of completeness, the method 850 is discussed fully below. The method 850 may be implemented by the FIFO controller 314, simultaneously with the overflow correction method 800.

According to the method 850, the controller 314 determines the difference $\Delta P$ in the read and write pointer positions (block 852). The controller 314 then determines whether the lag or read and write pointer difference $\Delta P$ is greater than the first underflow correction threshold $I_U$ (block 854). If it is not, the controller 314 takes another measurement of the lag or read and write pointer difference $\Delta P$ per block 852. If, on the other hand, the controller 314 determines that the lag $\Delta P$ is greater than the threshold $I_U$, the controller 314 sends a control signal to the spread-spectrum phase-locked loop 316 to add a negative (−) frequency offset $\Delta f_1$ to the frequency $f_{RCLK}$ of the spread clock signal RCLK (block 856).

The controller 314 then takes another measurement of the lag or read and write pointer difference $\Delta P$ (block 858). The controller 314 then determines whether the read and write pointer lag range has returned to normal by assessing whether the minimum lag $\Delta P_{MIN}$ is equal to the normal range minimum lag $\Delta P_{NOMMIN}$ (block 860). If the controller 314 determines that the read and write pointer lag range has returned to normal, the controller 314 sends a control signal to the spread-spectrum phase-locked loop 316 to remove the negative (−) frequency offset $\Delta f_1$ from the frequency $f_{RCLK}$ of the spread clock signal RCLK (block 866), and continues on to block 852. Otherwise, the controller 314 determines whether the read and write pointer lag $\Delta P$ is greater than the second underflow correction threshold $II_U$ (block 862). If the controller 314 determines that the lag $\Delta P$ is not greater than the threshold $II_U$, the controller 314 takes another measurement of the read and write pointer lag $\Delta P$ per block 858, and continues on to block 860. If, on the other hand, the controller 314 determines that the read and write pointer lag $\Delta P$ is greater than the second threshold $II_U$ (e.g., the underflow potential has become worse), the controller 314 then sends a control signal to the spread-spectrum phase-locked loop 316 to add more negative (−) frequency offset $\Delta f_2$ to the frequency $f_{RCLK}$ of the spread clock signal RCLK (block 864).

The controller 314 then takes another measurement of the lag or read and write pointer difference $\Delta P$ (block 868). The controller 314 then determines whether the lag $\Delta P$ is less than the second underflow threshold Hu (block 870). If the controller 314 determines that the lag $\Delta P$ is less than the second underflow threshold $II_U$ (e.g., meaning that the potential underflow situation is improving), the controller 314 sends a control signal to the spread-spectrum phase-locked loop 316 to remove the negative (−) frequency offset $\Delta f_2$ from the frequency $f_{RCLK}$ of the spread clock signal RCLK (block 871), and continues on to block 858. Otherwise, the controller 314 determines whether the read and write pointer lag $\Delta P$ is greater than the third underflow correction threshold $III_U$ (block 872). If the controller 314 determines that the lag $\Delta P$ is not greater than the threshold $III_U$, the controller 314 takes another measurement of the read and write pointer lag $\Delta P$ per block 868, and continues on to block 870. If, on the other hand, the controller 314 determines that the read and write pointer lag $\Delta P$ is greater than the third threshold $III_U$ (e.g., the underflow potential has become even worse), the controller 314 then sends a control signal to the spread-spectrum phase-locked loop 316 to add more negative (−) frequency offset $\Delta f_3$ to the frequency $f_{RCLK}$ of the spread clock signal RCLK (block 874).

The controller 314 then takes another measurement of the lag or read and write pointer difference $\Delta P$ (block 876). The controller 314 then determines whether the lag or read and write pointer difference $\Delta P$ is less than the third threshold $III_U$ (block 878). If the controller 314 determines that the lag $\Delta P$ is less than the third threshold $III_U$ (e.g., meaning that the potential underflow situation is improving), the controller 314 sends a control signal to the spread-spectrum phase-locked loop 316 to remove the negative (−) frequency offset $\Delta f_3$ from the frequency $f_{RCLK}$ of the spread clock signal RCLK (block 879), and continues on to block 868. Otherwise, the controller 314 determines whether the read and write pointer lag $\Delta P$ is greater than the underflow reset threshold $IV_U$ (block 880). If the controller 314 determines that the lag $\Delta P$ is not greater than the reset threshold $IV_U$, the controller 314 takes another measurement of the read and write pointer lag ΔP per block 876, and continues on to block 878. If, on the other hand, the controller 314 determines that the read and write pointer lag ΔP is greater than the reset threshold $IV_U$ (e.g., corrections are not improving the underflow situation), the controller 314 then sends a reset control signal to the write pointer generator 310, read pointer generator 312, and the spread-spectrum phase-locked loop 316 (block 882). It shall be understood that frequency offsets $\Delta f_1$, $\Delta f_2$, and $\Delta f_3$ may be the same or different, and may be static or dynamic.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. An apparatus for transferring data in a non-spread domain to a spread-domain, comprising:
    a first-in-first-out (FIFO) memory;
    a write pointer generator adapted to generate a write pointer for writing data into the FIFO memory in response to a first clock signal cycling with a substantially constant frequency;
    a spread-clock generator adapted to generate a frequency-modulated second clock signal based on the first clock signal;
    a read pointer generator adapted to generate a read pointer for reading data from the FIFO memory in response to the frequency-modulated second clock signal; and
    a controller adapted to control the spread-clock generator in response to the read and write pointers.

2. The apparatus of claim 1, wherein the controller is adapted to determine a lag of the read pointer to the write pointer.

3. The apparatus of claim 2, wherein the controller is adapted to control the spread-clock generator such that the spread-clock generator adds a first positive frequency offset to the frequency of the frequency-modulated second clock signal if the lag decreases below a first predetermined threshold.

4. The apparatus of claim 3, wherein the controller is adapted to control the spread-clock generator such that the spread-clock generator removes the first positive frequency offset from the frequency of the frequency-modulated second clock signal if the lag returns to a default range.

5. The apparatus of claim 3, wherein the controller is adapted to control the spread-clock generator such that the spread-clock generator adds a second positive frequency offset to the frequency of the frequency-modulated second clock signal again if the lag decreases below a second predetermined threshold that is less than the first predetermined threshold.

6. The apparatus of claim 5, wherein the controller is adapted to control the spread-clock generator such that the spread-clock generator removes the second positive frequency offset from the frequency of the frequency-modulated second clock signal if the lag increases above the second predetermined threshold.

7. The apparatus of claim 2, wherein the controller is adapted to reset the write and read pointer generators if the lag decreases below a predetermined reset threshold.

8. The apparatus of claim 2, wherein the controller is adapted to control the spread-clock generator such that the spread-clock generator adds a first negative frequency offset to the frequency of the frequency-modulated second clock signal if the lag increases above a first predetermined threshold.

9. The apparatus of claim 8, wherein the controller is adapted to control the spread-clock generator such that the spread-clock generator removes the first negative frequency offset from the frequency of the frequency-modulated second clock signal to a default value if the lag returns to a default range.

10. The apparatus of claim 8, wherein the controller is adapted to control the spread-clock generator such that the spread-clock generator adds a second negative frequency offset to the frequency of the frequency-modulated second clock signal if the lag increases above a second predetermined threshold that is greater than the first predetermined threshold.

11. The apparatus of claim 10, wherein the controller is adapted to control the spread-clock generator such that the spread-clock generator removes the second negative frequency offset from the frequency of the frequency-modulated second clock signal if the lag decreases below the second predetermined threshold.

12. The apparatus of claim 2, wherein the controller is adapted to reset the write and read pointer generators if the lag increases above a predetermined reset threshold.

13. The apparatus of claim 1, wherein the FIFO memory comprises:
    a plurality of input flip-flops each including a data input adapted to receive said data in the non-spread domain, and a clock input adapted to receive a corresponding portion of the write pointer;
    a multiplexer including a plurality of inputs coupled to respective outputs of the input flip-flops, and a select input adapted to receive the read pointer; and
    an output flip-flop including a data input coupled to an output of the multiplexer, a clock input adapted to receive the frequency-modulated second clock signal, and an output adapted to produce said data in the spread domain.

14. The apparatus of claim 1, wherein the spread-clock generator comprises a phase-locked loop.

15. The apparatus of claim 2, wherein the controller is adapted to determine the lag based on a number of cycles of the first or frequency-modulated second clock signal.

16. The apparatus of claim 3, wherein the first positive frequency offset is programmable or dynamically adjustable.

17. The apparatus of claim 1, wherein the controller is adapted to:
    determine when the frequency of the frequency-modulated second clock signal is substantially maximum; and
    control the write pointer generator and read pointer generator to initialize the read and write pointers such that a lag between the read and write pointers is substantially half the size of the FIFO memory.

18. The apparatus of claim 1, wherein the size of the FIFO memory is based on the frequency of the first clock signal, a frequency spreading of the frequency-modulated second clock signal, and the frequency modulation of the second clock signal.

19. A method of transferring data in a non-spread domain to a spread-domain, comprising:
    writing data into a first-in-first-out (FIFO) memory based on a read pointer and a first clock signal cycling with a substantially constant frequency;
    generating a frequency-modulated second clock signal based on the first clock signal;

reading data from the FIFO memory based on a write pointer and the second clock signal; and controlling the frequency of the frequency-modulated second clock signal in response to the read and write pointers.

20. The method of claim 19, wherein controlling the frequency of the frequency-modulated second clock signal comprises determining a lag of the read pointer to the write pointer.

21. The method of claim 20, wherein controlling the frequency of the frequency-modulated second clock signal comprises applying a positive frequency offset to the frequency of the frequency-modulated second clock signal if the lag decreases below a predetermined threshold.

22. The method of claim 21, wherein controlling the frequency of the second clock signal comprises removing the positive frequency offset from the frequency of the frequency-modulated second clock signal if the lag returns to a default range.

23. The method of claim 21, further comprising resetting the writing and reading of the data if the lag decreases below a predetermined reset threshold.

24. The method of claim 19, wherein controlling the frequency of the second clock signal comprises adding a negative frequency offset to the frequency of the frequency-modulated second clock signal if the lag increases above a predetermined threshold.

25. The method of claim 24, wherein controlling the frequency of the frequency-modulated second clock signal comprises removing the negative frequency offset from the frequency of the frequency-modulated second clock signal if the lag returns to a default range.

26. The method of claim 19, further comprising resetting the writing and reading of the data if the lag increases above a predetermined reset threshold.

27. A communication system, comprising:
a data source adapted to generate parallel data and a non-spread clock signal; and
a converter adapted to transfer the parallel data in response to a frequency-modulated spread clock signal, wherein the converter comprises:
a plurality of first-in-first-out (FIFO) memories adapted to receive respective parallel data;
a write pointer generator adapted to generate a write pointer for writing the parallel data respectively into the FIFO memories in response to the non-spread clock signal;
a spread-clock generator adapted to generate the frequency-modulated spread clock signal based on the non-spread clock signal;
a read pointer generator adapted to generate a read pointer for reading the parallel data from the respective FIFO memories in response to the frequency-modulated spread clock signal; and
a controller adapted to control the frequency-modulated spread-clock generator in response to the read and write pointers indicating a predetermined potential data overflow or underflow of the FIFO memories.

28. The communication system of claim 27, wherein the data source comprises a deserializer.

29. The communication system of claim 27, further comprising a serializer adapted to convert the parallel data from the respective FIFO memories into serial data.

* * * * *